United States Patent
Cavaliere et al.

(10) Patent No.: US 11,424,836 B2
(45) Date of Patent: Aug. 23, 2022

(54) PATH COMPUTATION ENGINE AND METHOD OF CONFIGURING AN OPTICAL PATH FOR QUANTUM KEY DISTRIBUTION

(71) Applicant: Telefonaktiebolaget LM Ericsson (publ), Stockholm (SE)

(72) Inventors: Fabio Cavaliere, Pisa (IT); Giulio Bottari, Pisa (IT); Tommaso Catuogno, Pisa (IT)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 17/048,300

(22) PCT Filed: Apr. 19, 2018

(86) PCT No.: PCT/EP2018/060027
§ 371 (c)(1),
(2) Date: Oct. 16, 2020

(87) PCT Pub. No.: WO2019/201441
PCT Pub. Date: Oct. 24, 2019

(65) Prior Publication Data
US 2021/0175977 A1 Jun. 10, 2021

(51) Int. Cl.
*H04B 10/70* (2013.01)
*H04J 14/02* (2006.01)
*H04L 9/08* (2006.01)

(52) U.S. Cl.
CPC .......... *H04B 10/70* (2013.01); *H04J 14/0267* (2013.01); *H04L 9/0855* (2013.01)

(58) Field of Classification Search
CPC .................. H04B 10/70; H04L 9/0855; H04J 14/0267–0271
See application file for complete search history.

(56) References Cited

U.S. PATENT DOCUMENTS 7,068,790 B1 * 6/2006 Elliott .................. H04L 9/0852
380/256
2009/0262942 A1 10/2009 Maeda et al.
(Continued)

OTHER PUBLICATIONS

Mlejnek et al.; Reducing spontaneous Raman scattering noise in high quantum bitrate QKD systems over optical fiber; Dec. 16, 2017; arXiv:1712.05891. (Year: 2017).*
(Continued)

*Primary Examiner* — Nathan M Cors
(74) *Attorney, Agent, or Firm* — Murphy, Bilak & Homiller, PLLC

(57) ABSTRACT

A path computation engine, PCE, (100) for an optical communications network comprising a plurality of nodes and a plurality of links. The PCE comprises a processor and memory comprising instructions executable by the processor whereby the PCE is operative to: receive a request to configure a quantum key, Qkey, path from a first node to a second node in the optical communications network for a quantum key distribution, QKD, signal for a quantum key for a secure data transmission signal; calculate a feasible Qkey path from the first node to the second node that is logically different to a traffic path from the first node to the second node for the secure data transmission signal, wherein the Qkey path is feasible if an optical signal power originating from the secure data transmission signal within the Qkey path, caused by optical interference of the secure data transmission signal with the QKD signal, is below a predetermined threshold value; and generate a control signal comprising instructions arranged to configure said feasible Qkey path.

18 Claims, 6 Drawing Sheets

(56) References Cited

U.S. PATENT DOCUMENTS

| | | |
|---|---|---|
| 2010/0202773 A1 | 8/2010 | Lee et al. |
| 2014/0376406 A1 | 12/2014 | Kim et al. |
| 2015/0350025 A1* | 12/2015 | Kadohata ............ H04J 14/0227 |
| | | 370/254 |
| 2016/0197723 A1 | 7/2016 | Takahashi |
| 2017/0026351 A1 | 1/2017 | Feller et al. |
| 2020/0044835 A1* | 2/2020 | Legre .................... H04B 10/70 |

OTHER PUBLICATIONS

Elliot, Chip, et al., "Quantum Cryptography in Practice", Aug. 25-29, 2003, 1-12.

Mlejnek, Michal, et al., "Reducing spontaneous Raman scattering noise in high quantum bit rate QKD systems over optical fiber", 1-27, 2017.

Stucki, D., et al., "Quantum Key Distribution over 67 km with a plug & play system", University of Geneva, Mar. 22, 2002, 1-10.

Wang, Liu-Jun, et al., "Long distance co-propagation of quantum key distribution and terabit classical optical data channels", Oct. 14, 2016, 1-8.

Guan, Kyle, et al., "Information-Theoretic Security in Space-Division Multiplexed Fiber Optic Networks", ECOC Technical Digest, OSA, 2012, 1-3.

* cited by examiner

PATH COMPUTATION ENGINE AND METHOD OF CONFIGURING AN OPTICAL PATH FOR QUANTUM KEY DISTRIBUTION

TECHNICAL FIELD

The invention relates to a path computation engine of an optical communications network, secure data transmission apparatus for an optical communications network and an optical communication network node. The invention further relates to a method of configuring an optical path for quantum key distribution in an optical communications network and to a method of secure data transmission in an optical communications network.

BACKGROUND

Quantum communication systems exploit the possibility of transmitting information encoded in quantum states, prepared in such a way that an eavesdropper between two communicating partners unavoidably introduces a detectable disturbance. In optical communications, the quantum information is encoded over a characteristic of a photon; for example, polarization state, phase or spin.

Quantum Key Distribution, QKD, solves the problem of key distribution in symmetric encryption systems. In theory, quantum encryption should be applied to the whole message that is to be transmitted; known as one-time pad encryption. However, this would unacceptably compromise capacity and latency of the communication channel, since feasible QKD systems can only work up to a few Mbit/s and require processing time for sender and receiver to agree the final quantum key, free of errors. In practice, QKD is only used to produce and distribute the key, not to transmit message data. The quantum key is then used with a classical encryption algorithm to encrypt and decrypt a message, transmitted over a classical high capacity communication channel.

Computation, validation, and establishment of optical paths are typical actions of a control plane or orchestrator in a wavelength switched optical network, WSON, comprising nodes having wavelength add/drop and switching capabilities. A Path Computation Engine, PCE, in a WSON receives data traffic demands and computes the best feasible path for the data traffic across the WSON, according to a given cost criterion, to route an optical signal carrying that data traffic from a source node to a destination node within the WSON.

For example, a PCE receives a traffic demand asking for the establishment of an optical channel between nodes A and D. The PCE is aware of the available resources in the nodes and links of the WSON and can verify some physical aspects related to optical transmission in optical fibre, i.e. physical impairments, and selects a path via nodes B and C, i.e. path A-B-C-D. If, in the same network, in addition to the traffic channel, it is required to establish a service channel for QKD between the two nodes A and D, current practice in WSONs is that the PCE will establish the QKD service channel on exactly the same path that has been selected for the data traffic. This has various drawbacks, as follows.

To exploit the "no cloning theorem", i.e. impossibility to fully replicate the quantum state of a photon, the principle on which the security of any quantum encryption protocol is based, single photon communication should be used. This makes the coexistence of the QKD signal with high power data traffic channels on the same physical medium problematic. The data traffic channel can cause interference with the QKD signal due, for example, to limited isolation of optical filters and Raman backscattering in optical fibre.

SUMMARY

It is an object to provide an improved path computation engine of an optical communications network. It is a further object to provide an improved secure data transmission apparatus for an optical communications network. It is a further object to provide an improved optical communication network node. It is a further object to provide an improved method of configuring an optical path for quantum key distribution in an optical communications network. It is a further object to provide an improved to a method of secure data transmission in an optical communications network.

An aspect of the invention provides a path computation engine, PCE, for an optical communications network, the optical communications network comprising a plurality of nodes and a plurality of links. The path computation engine comprises a processor and memory. The memory comprises instructions executable by the processor whereby the path computation engine is operative to receive a request to configure a quantum key, Qkey, path from a first node to a second node in the optical communications network for a quantum key distribution, QKD, signal for a quantum key for a secure data transmission signal. The memory comprises further instructions executable by the processor whereby the path computation engine is operative to calculate a feasible Qkey path from the first node to the second node that is logically different to a traffic path from the first node to the second node for the secure data transmission signal. The Qkey path is feasible if an optical signal power originating from the secure data transmission signal within the Qkey path, caused by optical interference of the secure data transmission signal with the QKD signal, is below a predetermined threshold value. The memory comprises further instructions executable by the processor whereby the path computation engine is operative to generate a control signal comprising instructions arranged to configure said feasible Qkey path.

Configuring an Qkey path that is logically different to a traffic path for the secure data transmission signal advantageously improves the performance, in terms of, for example, quantum key distribution rate and quantum key length, that may be achieved for the QKD channel as compared to the case where the secure data transmission signal and QKD signal are sent on the same optical path. Configuring an Qkey path that is logically different to a traffic path for the secure data transmission signal may also advantageously ensure that a feasible Qkey path is configured, since in some cases the traffic path is unfeasible for the QKD signal. Different paths across an optical communications network, such as a WSON, result in different impairments on the QKD signal and selecting the same optical path as the traffic path and the Qkey path is not necessarily the best choice for the QKD signal. The secure data transmission signal and the QKD signal typically have different requirements and constraints for distribution from a source node to a destination node in an optical communications network. Configuring a Qkey path that is logically different to the traffic path may advantageously enable better exploitation of the bandwidth resources in the optical communications network.

In an embodiment, the memory comprises instructions executable by the processor whereby the path computation engine is further operative to calculate at least one of: a raw key bit rate for transmission of a quantum key on the QKD signal depending on transmission characteristics of the calculated feasible Qkey path; and a quantum bit error rate for transmission of a quantum key on the QKD signal depending on transmission characteristics of the calculated feasible Qkey path. This advantageously enables a feasible raw key bit rate and a feasible quantum bit error rate to be calculated for the QKD signal for the calculated feasible Qkey path. The calculations may be made using the models for estimating these parameters disclosed, for example, in D. Stucki et al "Quantum key distribution over 67 km with a plug & play system", New J. Phys., vol. 4., 2002, 41.1-41.8.

In an embodiment, the memory comprises instructions executable by the processor whereby the path computation engine is further operative to receive a request to configure a new Qkey path from the first node to the second node for a new quantum key for the secure data transmission signal. The memory comprises further instructions executable by the processor whereby the path computation engine is operative to calculate a new feasible Qkey path from the first node to the second node that is logically different to the traffic path from the first node to the second node and is different to a previous Qkey path from the first node to the second node for a previous quantum key.

Even if a QKD system has been demonstrated to be theoretically unbreakable, in practice attacks can be successfully performed, exploiting vulnerabilities due to system implementation trade-offs. Advantageously, changing the Qkey path and the quantum key reduces the probability of successful eavesdropping.

In an embodiment, the memory comprises instructions executable by the processor whereby the path computation engine is operative to calculate a feasible Qkey path by: calculating a plurality of feasible Qkey paths from the first node to the second node; and randomly selecting one of said plurality of feasible Qkey paths. Each calculated Qkey path is logically different to the traffic path from the first node to the second node.

In an embodiment, the memory comprises instructions executable by the processor whereby the path computation engine is operative to receive a random number and to select one of said plurality of feasible Qkey paths based on the received random number.

In an embodiment, the memory comprises instructions executable by the processor whereby the path computation engine is operative to assign a respective randomly calculated weight value to each link of the optical communications network and to calculate a feasible Qkey path depending on said weight values.

In an embodiment, the memory comprises instructions executable by the processor whereby the path computation engine is operative to receive random numbers and to assign a respective random number as a weight value to each link of the optical communications network.

The use of random variables in the calculation of the new Qkey path advantageously makes the Qkey path calculation unpredictable, further enhancing the security level.

In an embodiment, the memory comprises instructions executable by the processor whereby the path computation engine is operative to calculate a feasible Qkey path from the first node to the second node that is physically different to the traffic path from the first node to the second node.

Configuring an Qkey path that is physically different to the traffic path from the first node to the second node for the secure data transmission signal advantageously improves the performance, in terms of, for example, quantum key distribution rate and quantum key length, that may be achieved for the QKD channel as compared to the case where the secure data transmission signal and QKD signal are sent on the same optical path. Configuring a Qkey path that is physically different to the traffic path may also advantageously ensure that a feasible Qkey path is configured for the QKD signal, since in some cases the traffic path is unfeasible for the QKD signal. Different paths across an optical communications network, such as a WSON, result in different impairments on the QKD signal and selecting the same optical path for secure data transmission signal and the QKD signal is not necessarily the best choice for the QKD signal. The secure data transmission signal and the QKD signal typically have different requirements and constraints for distribution from a source node to a destination node in an optical communications network. Configuring a Qkey path that is physically different to the traffic path may advantageously enable better exploitation of the bandwidth resources in the optical communications network.

In an embodiment, the memory comprises instructions executable by the processor whereby the path computation engine is operative to calculate a feasible Qkey path from the first node to the second node that does not include a repeater. This advantageously avoids regeneration of the QKD signal, which would destroy a quantum state of the QKD signal.

Corresponding embodiments equally apply to the secure data transmission apparatus for an optical communications network and the optical communications network node described below.

An aspect of the invention provides secure data transmission apparatus for an optical communications network comprising a traffic path computation engine, $PCE_T$, comprising a processor and memory, and a quantum key distribution, QKD, path computation engine, $PCE_Q$, comprising a processor and memory. The $PCE_T$ memory comprises instructions executable by the $PCE_T$ processor whereby the $PCE_T$ is operative to receive a request to configure a traffic path from a first node to a second node in the optical communications network for a secure data transmission signal. The $PCE_T$ memory comprises instructions executable by the $PCE_T$ processor whereby the $PCE_T$ is operative to calculate a traffic path from the first node to the second node for the secure data transmission signal. The $PCE_T$ memory comprises instructions executable by the $PCE_T$ processor whereby the $PCE_T$ is operative to generate a control signal comprising instructions arranged to configure the calculated traffic path. The $PCE_Q$ memory comprises instructions executable by the $PCE_Q$ processor whereby the $PCE_Q$ is operative to receive a request from the $PCE_T$ to configure a quantum key, Qkey, path from a first node to a second node in the optical communications network for a QKD signal for a quantum key for the secure data transmission signal. The $PCE_Q$ memory comprises further instructions executable by the $PCE_Q$ processor whereby the $PCE_Q$ is operative to calculate a feasible Qkey path from the first node to the second node that is logically different to the traffic path from the first node to the second node for the secure data transmission signal. The Qkey path is feasible if an optical signal power originating from the secure data transmission signal within the Qkey path, caused by optical interference of the secure data transmission signal with the QKD signal, is below a predetermined threshold value. The $PCE_Q$ memory comprises further instructions executable by the $PCE_Q$ processor whereby the $PCE_Q$ is operative to generate a control signal comprising instructions arranged to configure said feasible Qkey path.

Configuring an Qkey path that is logically different to the traffic path configured for a secure data transmission signal advantageously improves the performance, in terms of, for example, quantum key distribution rate and quantum key length, that may be achieved for the QKD channel as compared to the case where the secure data transmission signal and QKD signal are sent on the same optical path. Configuring a Qkey path that is logically different to the traffic path for the secure data transmission signal may also advantageously ensure that a feasible Qkey path is configured for the QKD signal, since in some cases the traffic path is unfeasible for the QKD signal. Different paths across an optical communications network, such as a WSON, result in different impairments on the QKD signal and selecting the same optical path as the traffic path and the Qkey path is not necessarily the best choice for the QKD signal. The secure data transmission signal and the QKD signal typically have different requirements and constraints for distribution from a source node to a destination node in an optical communications network. Configuring a Qkey path that is logically different to the traffic path may advantageously enable better exploitation of the bandwidth resources in the optical communications network.

In an embodiment, the $PCE_T$ memory comprises instructions executable by the $PCE_T$ processor whereby the $PCE_T$ is operative to calculate a traffic path from the first node to the second node for the secure data transmission signal based on a first path calculation algorithm and a first cost function. The $PCE_Q$ memory comprises instructions executable by the $PCE_Q$ processor whereby the $PCE_Q$ is operative to calculate a Qkey path from the first node to the second node for the QKD signal based on a second path calculation algorithm, different to the first path calculation algorithm and a second cost function, different to the first cost function. Advantageously the calculations of the traffic path and the Qkey path may take account of different parameters for each signal, such as different administrative costs, different wavelength continuity constraints and different propagation impairments, and may use different calculation rules.

In an embodiment, the apparatus is configured to periodically calculate a new Qkey path for a new quantum key, wherein a time period of the periodic calculation is lower than a predefined time. Periodically changing the Qkey path and the quantum key advantageously increases the level of security of transmission of the quantum key on the QKD signal. The predefined time depends on the encryption algorithm used to generate the quantum key and should be shorter than a time needed to hack the QKD signal, and can be updated (shortened) with development of computation devices and techniques used for code breaking.

Even if a QKD system has been demonstrated to be theoretically unbreakable, in practice attacks can be successfully performed, exploiting vulnerabilities due to system implementation trade-offs. Advantageously, changing the Qkey path periodically reduces the probability of successful eavesdropping.

In an embodiment, the $PCE_T$ is provided at a network node of the optical communications network and the $PCE_Q$ is provided at a network node of a secure data centre within the optical communications network. This may ensure security of generation and transmission of the QKD signal.

In an embodiment, the apparatus further comprises a quantum random number generator configured to generate random numbers.

This may improve the randomness of the generated random numbers and may reduce the likelihood of a malicious eavesdropper being able to predict the random numbers.

An aspect of the invention provides an optical communications network node comprising a path computation engine comprising a processor and memory. The memory comprises instructions executable by the processor whereby the path computation engine is operative to receive a request to configure a quantum key, Qkey, path from a first node to a second node in the optical communications network for a quantum key distribution, QKD, signal for a quantum key for a secure data transmission signal. The memory comprises further instructions executable by the processor whereby the path computation engine is operative to calculate a feasible Qkey path from the first node to the second node that is logically different to a traffic path from the first node to the second node for the secure data transmission signal. The Qkey path is feasible if an optical signal power originating from the secure data transmission signal within the Qkey path, caused by optical interference of the secure data transmission signal with the QKD signal, is below a predetermined threshold value. The memory comprises further instructions executable by the processor whereby the path computation engine is operative to generate a control signal comprising instructions arranged to configure said feasible Qkey path.

The optical communications network node is advantageously able to configure an Qkey path that is logically different to a traffic path for a secure data transmission signal, which may improve the performance, in terms of, for example, quantum key distribution rate and quantum key length, that may be achieved for the QKD channel as compared to the case where the secure data transmission signal and QKD signal are sent on the same optical path. Configuring a Qkey path that is logically different to the traffic path for the secure data transmission signal may also advantageously ensure that a feasible Qkey path is configured, since in some cases the traffic path is unfeasible for the QKD signal. Different paths across an optical communications network, such as a WSON, result in different impairments on the QKD signal and selecting the same optical path as the traffic path and the Qkey path is not necessarily the best choice for the QKD signal. The secure data transmission signal and the QKD signal typically have different requirements and constraints for distribution from a source node to a destination node in an optical communications network. Configuring a Qkey path that is logically different to the traffic path may advantageously enable better exploitation of the bandwidth resources in the optical communications network.

In an embodiment, the optical communications network node is for a secure data centre network.

In an embodiment, the optical communications network node further comprises a quantum random number generator configured to generate random numbers for use by the path computation engine.

In an embodiment, the optical communications network node is configured to receive a quantum encrypted signal carrying random numbers for use by the path computation engine.

An aspect of the invention provides a method of configuring an optical path for quantum key distribution in an optical communications network. The method comprises a step of receiving a request to configure a quantum key, Qkey, path from a first node to a second node in the optical communications network for a quantum key distribution, QKD, signal for a quantum key for a secure data transmission signal. The method further comprises a step of calculating a feasible Qkey path from the first node to the second node that is logically different to a traffic path from the first node to the second node for the secure data transmission signal. The Qkey path is feasible if an optical signal power originating from the secure data transmission signal within the Qkey path, caused by optical interference of the secure data transmission signal with the QKD signal, is below a predetermined threshold value. The method further comprises a step of generating a control signal comprising instructions arranged to configure said feasible Qkey path.

Configuring a Qkey path that is logically different to a traffic path for the secure data transmission signal advantageously improves the performance, in terms of, for example, quantum key distribution rate and quantum key length, that may be achieved for the QKD channel as compared to the case where the secure data transmission signal and QKD signal are sent on the same optical path. Configuring a Qkey path that is logically different to a traffic path for the secure data transmission signal may also advantageously ensure that a feasible Qkey path is configured for the QKD signal, since in some cases the traffic path is unfeasible for the QKD signal. Different paths across an optical communications network, such as a WSON, result in different impairments on the QKD signal and selecting the same optical path as the traffic path and the Qkey path is not necessarily the best choice for the QKD signal. The secure data transmission signal and the QKD signal typically have different requirements and constraints for distribution from a source node to a destination node in an optical communications network. Configuring a Qkey path that is logically different to the traffic path may advantageously enable better exploitation of the bandwidth resources in the optical communications network.

In an embodiment, the method further comprises calculating at least one of: a raw key bit rate for transmission of a quantum key on the QKD signal depending on transmission characteristics of the calculated feasible Qkey path; and a quantum bit error rate for transmission of a quantum key on the QKD signal depending on transmission characteristics of the calculated feasible Qkey path. This advantageously enables a feasible raw key bit rate and a feasible quantum bit error rate to be calculated for the QKD signal for the calculated feasible Qkey path.

In an embodiment, the method further comprises receiving a request to configure a new Qkey path from the first node to the second node for a new quantum key for the secure data transmission signal. The method further comprises calculating a new feasible Qkey path from the first node to the second node that is logically different to the traffic path from the first node to the second node and is different to a previous Qkey path from the first node to the second node for a previous quantum key.

Even if a QKD system has been demonstrated to be theoretically unbreakable, in practice attacks can be successfully performed, exploiting vulnerabilities due to system implementation trade-offs. Advantageously, changing the Qkey path and the quantum key reduces the probability of successful eavesdropping.

In an embodiment, the step of calculating a feasible Qkey path comprises: calculating a plurality of feasible Qkey paths from the first node to the second node, each calculated Qkey path being logically different to the traffic path; and randomly selecting one of said plurality of feasible Qkey paths.

In an embodiment, randomly selecting one of said plurality of feasible Qkey paths comprises receiving a random number and selecting one of said plurality of feasible Qkey paths based on the received random number.

In an embodiment, the step of calculating a feasible Qkey path comprises: assigning a respective randomly calculated weight value to each link of the optical communications network; and calculating a feasible Qkey path depending on said weight values.

In an embodiment, assigning a respective randomly calculated weight value to each link of the optical communications network comprises receiving random numbers and assigning a respective random number as a weight value to each link of the optical communications network.

The use of random variables in the calculation of the new Qkey path advantageously makes the Qkey path calculation unpredictable, further enhancing the security level.

In an embodiment, the step of calculating a feasible Qkey path comprises calculating a feasible Qkey path from the first node to the second node that is physically different to the traffic path from the first node to the second node.

Configuring an Qkey path that is physically different to the traffic path from the first node to the second node for the secure data transmission signal advantageously improves the performance, in terms of, for example, quantum key distribution rate and quantum key length, that may be achieved for the QKD channel as compared to the case where the secure data transmission signal and QKD signal are sent on the same optical path. Configuring a Qkey path that is physically different to the traffic path may also advantageously ensure that a feasible Qkey path is configured, since in some cases the traffic path is unfeasible for the QKD signal. Different paths across an optical communications network, such as a WSON, result in different impairments on the QKD signal and selecting the same optical path as the traffic path and the Qkey path is not necessarily the best choice for the QKD signal. The secure data transmission signal and the QKD signal typically have different requirements and constraints for distribution from a source node to a destination node in an optical communications network. Configuring a Qkey path that is physically different to the traffic path may advantageously enable better exploitation of the bandwidth resources in the optical communications network.

In an embodiment, the step of calculating a feasible Qkey path comprises calculating a feasible Qkey path from the first node to the second node that does not include a repeater. This advantageously avoids regeneration of the QKD signal, which would destroy a quantum state of the QKD signal.

In an embodiment, the method comprises periodically calculating a new Qkey path for a new quantum key, wherein a time period of the periodic calculation is lower than a predefined time.

Periodically changing the Qkey path and the quantum key advantageously increases the level of security of transmission of the quantum key on the QKD signal. The predefined time depends on the encryption algorithm used to generate the quantum key and should be shorter than a time needed to hack the QKD signal, and can be updated (shortened) with development of computation devices and techniques used for code breaking.

Even if a QKD system has been demonstrated to be theoretically unbreakable, in practice attacks can be successfully performed, exploiting vulnerabilities due to system implementation trade-offs. Advantageously, changing the Qkey path periodically reduces the probability of successful eavesdropping.

Corresponding embodiments apply equally to the method of secure data transmission in an optical communications network described below.

An aspect of the invention provides a method of secure data transmission in an optical communications network. The method comprises a step of receiving a request to configure a traffic path from a first node to a second node in the optical communications network for a secure data transmission signal. The method further comprises a step of calculating a traffic path from the first node to the second node for the secure data transmission signal. The method further comprises a step of generating a control signal comprising instructions arranged to configure the calculated traffic path. The method further comprises a step of receiving a request to configure quantum key, Qkey, path from a first node to a second node in the optical communications network for a quantum key distribution, QKD, signal for a quantum key for the secure data transmission signal. The method further comprises a step of calculating a feasible Qkey path from the first node to the second node that is logically different to the traffic path from the first node to the second node for the secure data transmission signal. The Qkey path is feasible if an optical signal power originating from the secure data transmission signal within the Qkey path, caused by optical interference of the secure data transmission signal with the QKD signal, is below a predetermined threshold value. The method further comprises a step of generating a control signal comprising instructions arranged to configure said feasible Qkey path.

Configuring a Qkey path that is logically different to the traffic path configured for a secure data transmission signal advantageously improves the performance, in terms of, for example, quantum key distribution rate and quantum key length, that may be achieved for the QKD channel as compared to the case where the secure data transmission signal and QKD signal are sent on the same optical path. Configuring a Qkey path that is logically different to the traffic path for the secure data transmission signal may also advantageously ensure that a feasible optical path is configured for the QKD signal, since in some cases the traffic path is unfeasible for the QKD signal. Different paths across an optical communications network, such as a WSON, result in different impairments on the QKD signal and selecting the same optical path as the traffic path and the Qkey path is not necessarily the best choice for the QKD signal. The secure data transmission signal and the QKD signal typically have different requirements and constraints for distribution from a source node to a destination node in an optical communications network. Configuring a Qkey path that is logically different to the traffic path may advantageously enable better exploitation of the bandwidth resources in the optical communications network.

An aspect of the invention provides a computer program, comprising instructions which, when executed on at least one processor, cause the at least one processor to carry out any of the above steps of the method of configuring an optical path for quantum key distribution in an optical communications network.

An aspect of the invention provides a computer program, comprising instructions which, when executed on at least one processor, cause the at least one processor to carry out any of the above steps of the method of secure data transmission in an optical communications network.

An aspect of the invention provides a carrier containing a computer program, comprising instructions which, when executed on at least one processor, cause the at least one processor to carry out any of the above steps of the method of configuring an optical path for quantum key distribution in an optical communications network. The carrier is one of an electronic signal, optical signal, radio signal, or computer readable storage medium.

An aspect of the invention provides a carrier containing a computer program, comprising instructions which, when executed on at least one processor, cause the at least one processor to carry out any of the above steps of the method of secure data transmission in an optical communications network. The carrier is one of an electronic signal, optical signal, radio signal, or computer readable storage medium.

A path computation engine could be implemented as one or more processors, hardware, processing hardware or circuitry.

References to processors, hardware, processing hardware or circuitry can encompass any kind of logic or analog circuitry, integrated to any degree, and not limited to general purpose processors, digital signal processors, ASICs, FPGAs, discrete components or logic and so on. References to a processor are intended to encompass implementations using multiple processors which may be integrated together, or co-located in the same node or distributed at different locations for example.

Embodiments of the invention will now be described, by way of example only, with reference to the accompanying drawings.

DETAILED DESCRIPTION

The same reference numbers will used for corresponding features in different embodiments.

Figure 1:
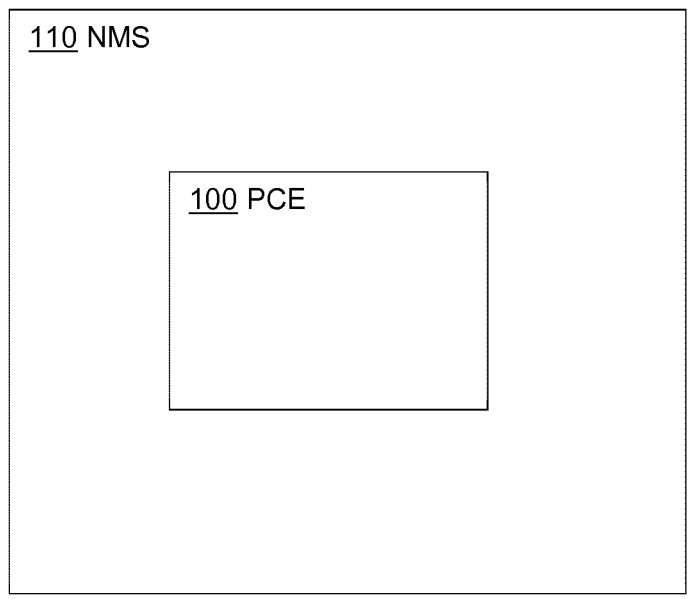
FIG. 1 is a schematic representation of a path computation engine of an optical communications network according to an embodiment of the invention.

Referring to FIG. 1, an embodiment of the invention provides a path computation engine, PCE, 100 for an optical communications network, the optical communications network comprising a plurality of nodes and a plurality of links. The PCE 100 comprises a processor and memory. The memory comprises instructions executable by the processor whereby the path computation engine is operative to receive a request to configure a quantum key, Qkey, path from a first node to a second node in the optical communications network for a quantum key distribution, QKD, signal for a quantum key for a secure data transmission signal. The memory comprises further instructions executable by the processor whereby the path computation engine is operative to calculate a feasible Qkey path from the first node to the second node that is logically different to a traffic path from the first node to the second node for the secure data transmission signal.

The Qkey path is feasible if an optical signal power, originating from the secure data transmission signal, within the Qkey path is below a predetermined threshold value. Optical interference may occur between the secure data transmission signal and the QKD signal, resulting in some optical power from the secure data transmission signal being present within the Qkey path. The optical interference may be due to one or more of: spontaneous Raman scattering, four-wave mixing, and channel crosstalk. If the amount of optical signal power that is scattered, mixed, etc, from the secure data transmission signal into the Qkey path is below a predetermined threshold, the Qkey path is feasible.

The memory comprises further instructions executable by the processor whereby the path computation engine is operative to generate a control signal comprising instructions arranged to configure the calculated feasible Qkey path.

The PCE 100 may be provided within the network management system, NMS, 110 of the optical communications network.

In an embodiment, the memory comprises instructions executable by the processor whereby the PCE 100 is operative to calculate a raw key bit rate for transmission of a quantum key on the QKD signal. The raw key bit rate is calculated depending on transmission characteristics of the calculated feasible Qkey path. The memory may additionally or alternatively comprise instructions executable by the processor whereby the PCE 100 is operative to calculate a quantum bit error rate for transmission of a quantum key on the QKD signal. The quantum bit error rate is calculated depending on transmission characteristics of the calculated feasible Qkey path. The calculations may be made using the models for estimating these parameters disclosed, for example, in D. Stucki et al "Quantum key distribution over 67 km with a plug & play system", New J. Phys., vol. 4., 2002, 41.1-41.8.

In an embodiment, the memory comprises instructions executable by the processor whereby the PCE 100 is operative to receive a request to configure a new Qkey path from the first node to the second node for a new quantum key for the secure data transmission signal. The memory comprises further instructions executable by the processor whereby the PCE is operative to calculate a new feasible Qkey path from the first node to the second node that is logically different to the traffic path from the first node to the second node. The new feasible Qkey path is also different to a previous Qkey path from the first node to the second node for a previous quantum key; the previous Qkey path may be the Qkey path that the new Qkey path is replacing or any previously configured Qkey path used for the QKD signal, over a time limited period or over an unlimited time period.

In an embodiment, the memory comprises instructions executable by the processor whereby the PCE 100 is operative to calculate a feasible Qkey path by calculating a plurality of feasible Qkey paths from the first node to the second node and randomly select one of the calculated plurality of feasible optical paths. Each calculated Qkey path is logically different to the traffic path from the first node to the second node.

In an embodiment, the memory comprises instructions executable by the processor whereby the PCE 100 is operative to receive a random number and to select one of the plurality of feasible Qkey paths based on the received random number.

In an embodiment, the memory comprises instructions executable by the processor whereby the PCE 100 is operative to assign a respective randomly calculated weight value to each link of the optical communications network and to calculate a feasible Qkey path depending on the randomly calculated weight values assigned to the links.

The memory may comprise instructions executable by the processor whereby the PCE 100 is operative to receive random numbers, for example from a quantum random number generator, QRNG.

In an embodiment, the memory comprises instructions executable by the processor whereby the PCE 100 is operative to calculate a feasible Qkey path from the first node to the second node that is physically different to the traffic path from the first node to the second node.

In an embodiment, the memory comprises instructions executable by the processor whereby the PCE 100 is operative to calculate a feasible Qkey path from the first node to the second node that does not include a repeater, such as a 3R (reamplification, reshaping and retiming) regenerator or an optical amplifier.

Corresponding embodiments equally apply to the optical communications network node described with reference to FIG. 4 below.

Figure 2:
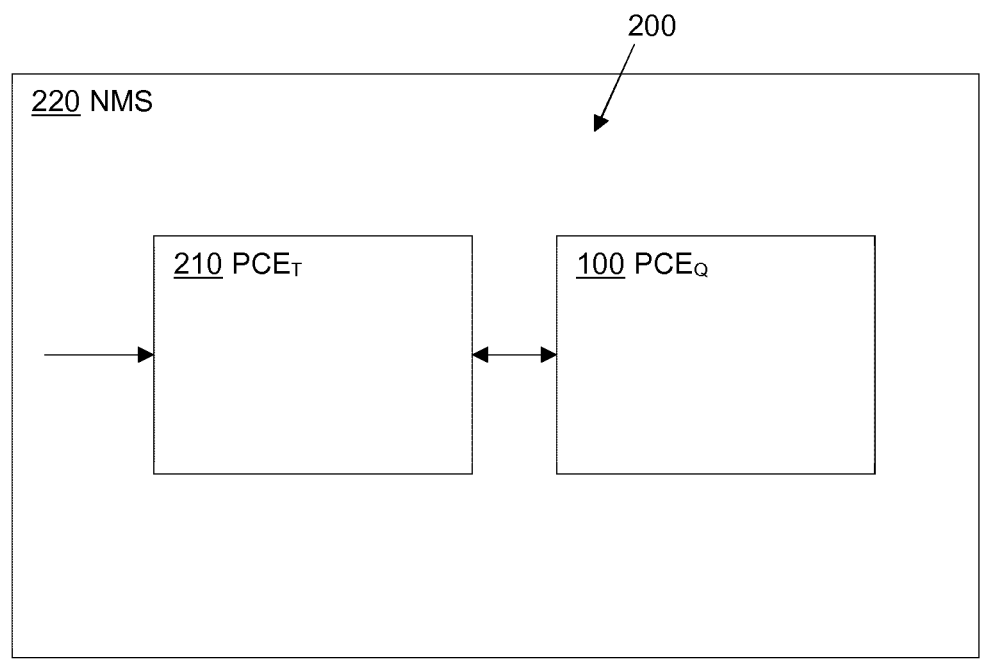
FIGS. 2 and 3 are schematic representations of secure data transmission apparatus for an optical communications network according to an embodiment of the invention.

Referring to FIG. 2, an embodiment of the invention provides secure data transmission apparatus 200 for an optical communications network comprising a traffic path computation engine, $PCE_T$, and a quantum key distribution, QKD, path computation engine, $PCE_Q$, 100 as described above with reference to FIG. 1.

The $PCE_T$ 210 comprises a processor and memory. The memory comprises instructions executable by the $PCE_T$ processor whereby the $PCE_T$ is operative to receive a request to configure a traffic path from a first node to a second node in the optical communications network for a secure data transmission signal. The $PCE_T$ memory comprises instructions executable by the $PCE_T$ processor whereby the $PCE_T$ is operative to calculate a traffic path from the first node to the second node for the secure data transmission signal. The $PCE_T$ memory comprises instructions executable by the $PCE_T$ processor whereby the $PCE_T$ is operative to generate a control signal comprising instructions arranged to configure the calculated traffic path.

The $PCE_Q$ memory comprises instructions executable by the $PCE_Q$ processor whereby the $PCE_Q$ is operative to receive a request from the $PCE_T$ to configure a Qkey path from a first node to a second node in the optical communications network for a QKD signal for a quantum key for the secure data transmission signal.

The $PCE_Q$ 100 and the $PCE_T$ 210 may be provided within a network management system, NMS, 220 of an optical communications network.

In an embodiment, the $PCE_T$ 210 is provided at a network node of the optical communications network and the $PCE_Q$ 100 is provided at a network node of a secure data centre within the optical communications network.

In an embodiment, the $PCE_T$ memory comprises instructions executable by the $PCE_T$ processor whereby the $PCE_T$ 210 is operative to calculate a traffic path from the first node to the second node based on a first path calculation algorithm and a first cost function. The $PCE_Q$ memory comprises instructions executable by the $PCE_Q$ processor whereby the $PCE_Q$ 100 is operative to calculate a Qkey path from the first node to the second node based on a second path calculation algorithm, different to the first path calculation algorithm and a second cost function, different to the first cost function.

In an embodiment, the secure data transmission apparatus 200 is configured to periodically calculate a new Qkey path for a new quantum key. The $PCE_T$ memory comprises instructions executable by the $PCE_T$ processor whereby the $PCE_T$ 210 is operative to periodically receive an indication that a new quantum key is to be distributed and to send a request to the $PCE_Q$ 100 to configure a new Qkey path for the new quantum key.

A time period of the periodic calculation is lower than a predefined time. The predefined time depends on the encryption algorithm used to generate the quantum key and should be shorter than a time needed to hack the QKD signal. The predefined time can be updated, typically it would be expected to be shortened, with development of computation devices and techniques used for code breaking.

In an embodiment, the apparatus further comprises a quantum random number generator configured to generate random numbers.

Figure 3:
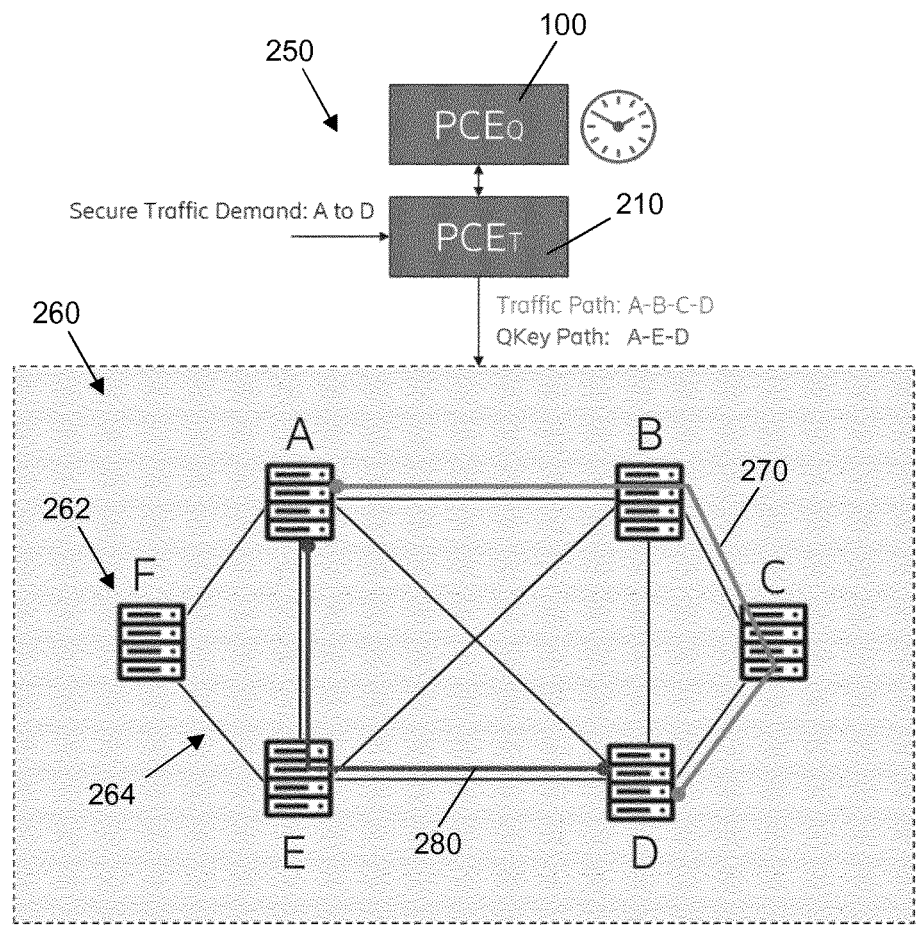

FIG. 3 illustrates secure data transmission apparatus 250 for an optical communications network 260 comprising a plurality of nodes A-F 262 and a plurality of links 264. The apparatus 250 comprises a traffic path computation engine, $PCE_T$, 210 as described above with reference to FIG. 2, and a quantum key distribution, QKD, path computation engine, $PCE_Q$, 100 as described above with reference to FIG. 1.

The $PCE_T$ receives a request to securely route data traffic from node A to node D, using a quantum secured optical signal. In addition to configuring a traffic path from node A to node D for a secure data transmission signal, a Qkey path must also be configured from node A to node D for a QKD signal for a quantum key for the secure data transmission signal.

In order to keep the routing calculations for the traffic path and the Qkey path logically separated, the apparatus 250 comprises two logically distinct PCEs; one for the data traffic, $PCE_T$ 210, and one for the QKD signal, $PCE_Q$ 100. The two PCEs may also be hosted at different sites, with the $PCE_Q$ preferably being hosted within a secure data centre to ensure security of the quantum key and the QKD signal.

The $PCE_T$ is operative to configure the traffic path according to well-known routing techniques, such as Dijkstra or Bellman-Ford. Parameters used for routing are, for example, administrative cost, wavelength continuity, and impairments related limitations.

The $PCE_T$ is operative to then communicate with the $PCE_Q$ to request the $PCE_Q$ to configure a Qkey path from node A to node D for a QKD signal. The $PCE_Q$ operates according to different criteria than the $PCE_T$. For example, if a service channel is dedicated to QKD within the network 260, the $PCE_Q$ does not need to perform wavelength assignment but just has to check possible wavelength contentions of the channel on the network links 264. Alternatively, for example, wavelength assignment for the QKD signal could be performed based on wavelength continuity constraints and feasibility assessed based on propagation impairments; using calculation rules that are different to those use by the $PCE_T$.

In this example, the $PCE_T$ configures traffic path A-B-C-D 270 and $PCE_Q$ configures Qkey path A-E-D 280. The Qkey path from node A to node D across the network 260 is therefore physically different from the traffic path from node A to node D; the two paths share only the end nodes A and D.

The $PCE_Q$ is operative to periodically calculate a new Qkey path, while the traffic path remains the same. The time period of the periodic calculation is lower than a predetermined time. This time depends on the encryption algorithm used to generate the quantum key and should be lower than the estimated time required for an eavesdropper to hack the quantum key. For example, if the quantum key is generated using the AES algorithm, to ensure a minimal advantage to an eavesdropper of $\frac{1}{2}^{32}$ a new optical path must be calculated after encrypting $2^{48}$ blocks of data. A new quantum key may also be generated for transmission on the QKD signal on the new Qkey path.

In calculating the new Qkey path, a random weight (cost) of each link may be generated to make the result unpredictable to an eavesdropper. Alternatively, a set of feasible Qkey paths may be calculated in advance and one of them then randomly selected for use. In both cases, the apparatus 250 may comprise a Quantum Random Number Generator, QRNG, operative to generate random numbers or may be configured to receive random numbers. The apparatus is operative to provide the random numbers to the $PCE_Q$. The $PCE_Q$ is operative to use the random numbers in calculating the new Qkey path, either as the random weights for the links or to select one of the feasible Qkey paths. Both approaches make the new Qkey path unpredictable.

As result of a new calculation, with the links having different random weights, the $PCE_Q$ may, for example, find that Qkey path A-F-E-D has a lower cost than Qkey path A-E-D, so Qkey path A-F-E-D would be selected.

Once the Qkey path has been configured, a raw key bit rate and a quantum bit error rate are estimated for the QKD signal for the configured Qkey path. This estimation may optimize performance of the QKD signal on the configured Qkey path since the feasible raw key bit rate and the quantum bit error rate may vary with the transmission characteristics of the configured Qkey path. The calculations may be made using the models for estimating these parameters disclosed, for example, in D. Stucki et al "Quantum key distribution over 67 km with a plug & play system", New J. Phys., vol. 4., 2002, 41.1-41.8. The main parameters considered are the transmission distance, the characteristic of the laser and detector, the amount of noise in the QKD optical signal and the quantum protocols employed. For example, transmitting a QKD optical signal, using the phase-encoding BB84 protocol, across a 50 km optical path in the presence of a set of data transmission signals having a throughput of 6.38 Tbps and having different wavelengths, and detecting the QKD signal using a single-photon avalanche diode, SPAD, detector with a detection efficiency of 0.1, one would estimate to achieve a net quantum key bit rate of 14.8 kbps. Increasing the distance to 80 km would lead to a new reduced quantum key rate of 1 kbps, as shown in D. Stucki et al "Quantum key distribution over 67 km with a plug & play system", New J. Phys., vol. 4., 2002, 41.1-41.8. Once a feasible quantum bit error rate has also been estimated, the quantum key can be transmitted safely on the QKD signal.

Figure 4:
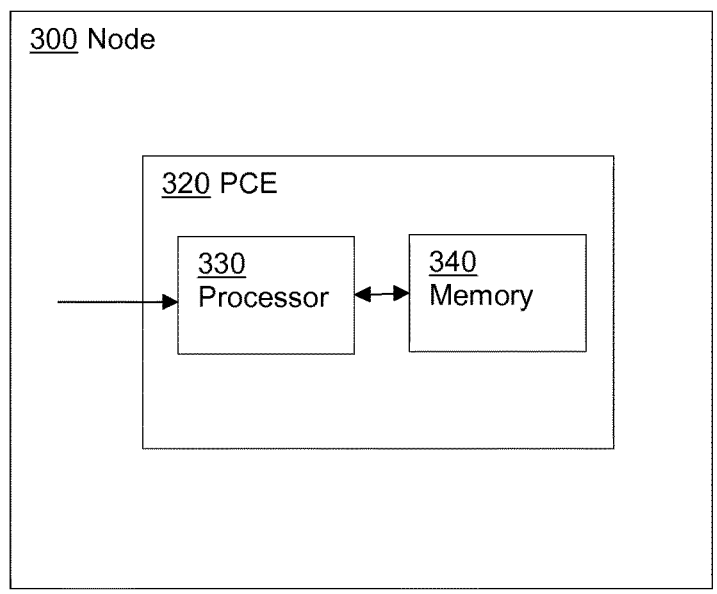
FIG. 4 is a schematic representation of an optical communications network node according to an embodiment of the invention.

Referring to FIG. 4, an embodiment of the invention provides an optical communications network node 300 comprising a path computation engine, PCE, 320. The PCE 320 is substantially the same as the PCE 100 described above and comprises a processor 330 and memory 340. The memory 340 comprises instructions executable by the processor whereby the PCE 320 is operative to:

receive a request to configure a Qkey path from a first node to a second node in the optical communications network for a quantum key distribution, QKD, signal for a quantum key for a secure data transmission signal;

calculate a feasible Qkey path from the first node to the second node that is logically different to a traffic path from the first node to the second node for the secure data transmission signal, wherein the Qkey path is feasible if an optical signal power originating from the secure data transmission signal within the Qkey path, caused by optical interference of the secure data transmission signal with the QKD signal, is below a predetermined threshold value; and generate a control signal comprising instructions arranged to configure said feasible Qkey path.

In an embodiment, the optical communications network node 300 further comprises a QRNG configured to generate random numbers for use by the PCE 320.

In an embodiment, the optical communications network node is configured to receive a quantum encrypted signal carrying random numbers for use by the PCE 320.

Figure 5:
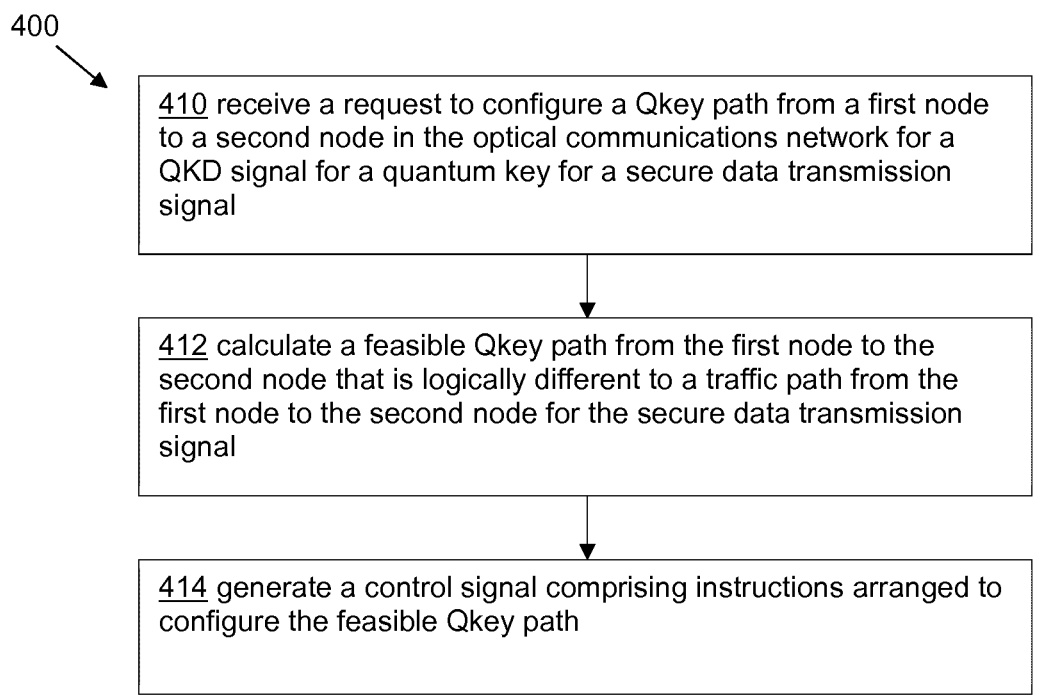
FIGS. 5 to 8 illustrate steps of methods of configuring an optical path for quantum key distribution in an optical communications network according to embodiments of the invention.

Referring to FIG. 5, an embodiment of the invention provides a method 400 of configuring an optical path for quantum key distribution in an optical communications network. The method comprises a step of receiving 410 a request to configure quantum key, Qkey, path from a first node to a second node in the optical communications network for a QKD signal for a quantum key for a secure data transmission signal. The method comprises a step of calculating 412 a feasible Qkey path from the first node to the second node that is logically different to a traffic path from the first node to the second node for the secure data transmission signal. The Qkey path is feasible if an optical signal power originating from the secure data transmission signal within the Qkey path, caused by optical interference of the secure data transmission signal with the QKD signal, is below a predetermined threshold value. The method comprises a step of generating 414 a control signal comprising instructions arranged to configure said feasible Qkey path.

In an embodiment, the method further comprises, once the Qkey path has been configured, calculating a raw key bit rate for transmission of a quantum key on the QKD signal depending on transmission characteristics of the calculated feasible Qkey path. The method may alternatively or additionally comprise calculating a quantum bit error rate for transmission of a quantum key on the QKD signal depending on transmission characteristics of the calculated feasible Qkey path.

The calculations may be made using the models for estimating these parameters disclosed, for example, in D. Stucki et al "Quantum key distribution over 67 km with a plug & play system", New J. Phys., vol. 4., 2002, 41.1-41.8.

Figure 6:
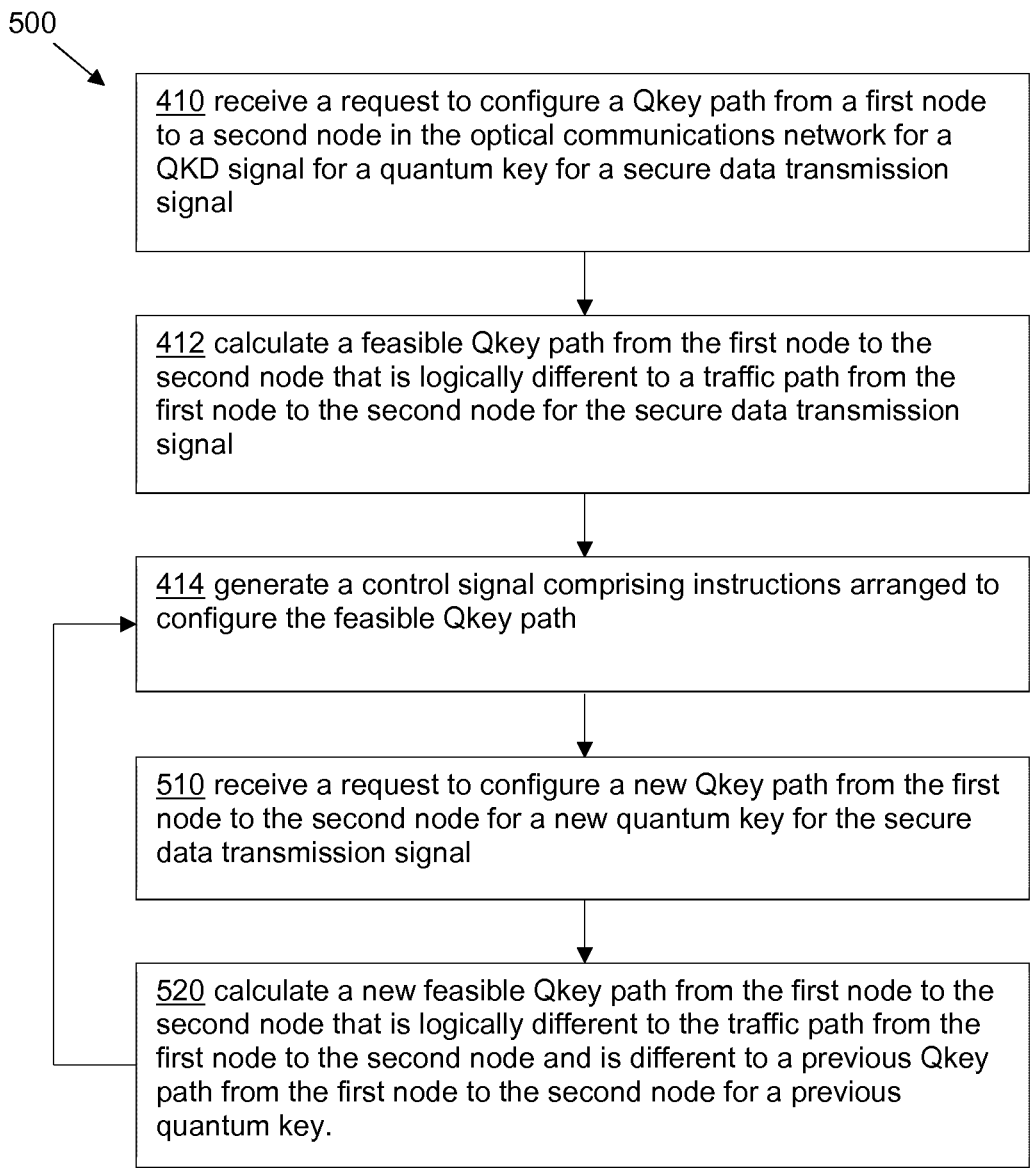

Referring to FIG. 6, in an embodiment, the method 500 further comprises receiving 510 a request to configure a new Qkey path from the first node to the second node for a new quantum key for the secure data transmission signal. The method further comprises calculating 520 a new feasible Qkey path from the first node to the second node that is logically different to the traffic path from the first node to the second node and is different to a previous Qkey path from the first node to the second node for a previous quantum key. The previous Qkey path may be the Qkey path that the new Qkey path is replacing or any previously configured Qkey path used for the QKD signal.

Figure 7:
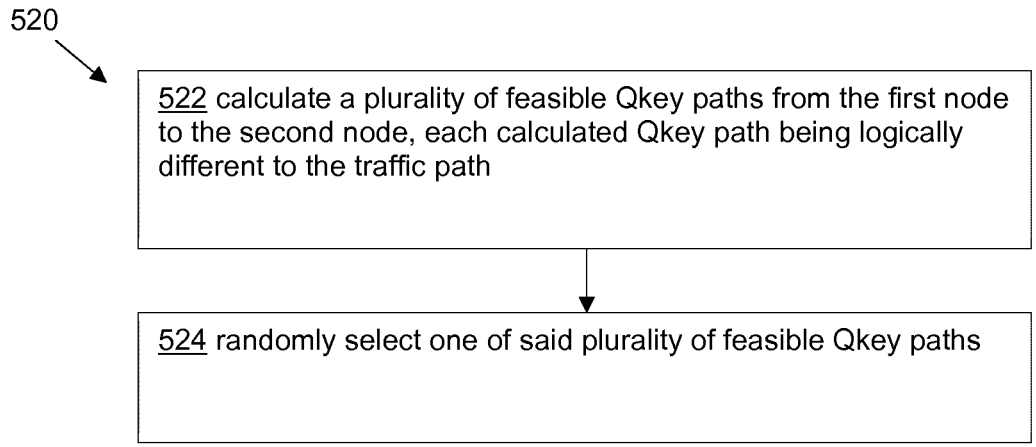

Referring to FIG. 7, in an embodiment, the step of calculating 520 a feasible Qkey path comprises calculating 522 a plurality of feasible Qkey paths from the first node to the second node. Each calculated Qkey path is logically different to the traffic path. One of the calculated feasible Qkey paths is then randomly selected 524 for use.

In an embodiment, the method comprises receiving a random number and selecting one of the calculated feasible Qkey paths based on the received random number.

Figure 8:
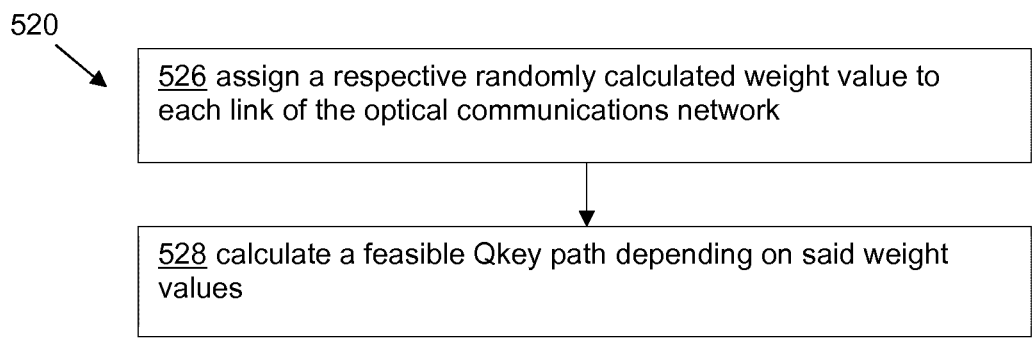

Referring to FIG. 8, in an embodiment, the step of calculating 520 a feasible Qkey path comprises assigning 526 a respective randomly calculated weight value to each link of the optical communications network. The step of calculating 520 a feasible Qkey path comprises calculating 528 a feasible Qkey path depending on the assigned randomly calculated weight values.

In an embodiment, the method comprises receiving random numbers and assigning a respective random number to each link as the weight value for the link.

In an embodiment, the step of calculating a feasible v path comprises calculating a feasible Qkey path from the first node to the second node that is physically different to the traffic path from the first node to the second node.

In an embodiment, the step of calculating a feasible Qkey path comprises calculating a feasible Qkey path from the first node to the second node for the QKD signal that does not include a repeater.

In an embodiment, the method comprises periodically calculating a new Qkey path for a new quantum key. A time period of the periodic calculation is lower than a predefined time. The predefined time depends on the encryption algorithm used to generate the quantum key and should be shorter than a time needed to hack the QKD signal. The predefined time can be updated, typically it would be expected to be shortened, with development of computation devices and techniques used for code breaking.

An embodiment of the invention provides a computer program, comprising instructions which, when executed on at least one processor, cause the at least one processor to carry out any of the above steps of the method 400, 500 of configuring an optical path for quantum key distribution in an optical communications network.

An embodiment of the invention provides a carrier containing a computer program, comprising instructions which, when executed on at least one processor, cause the at least one processor to carry out any of the above steps of the method 400, 500 of configuring an optical path for quantum key distribution in an optical communications network. The carrier is one of an electronic signal, optical signal, radio signal, or computer readable storage medium.

Figure 9:
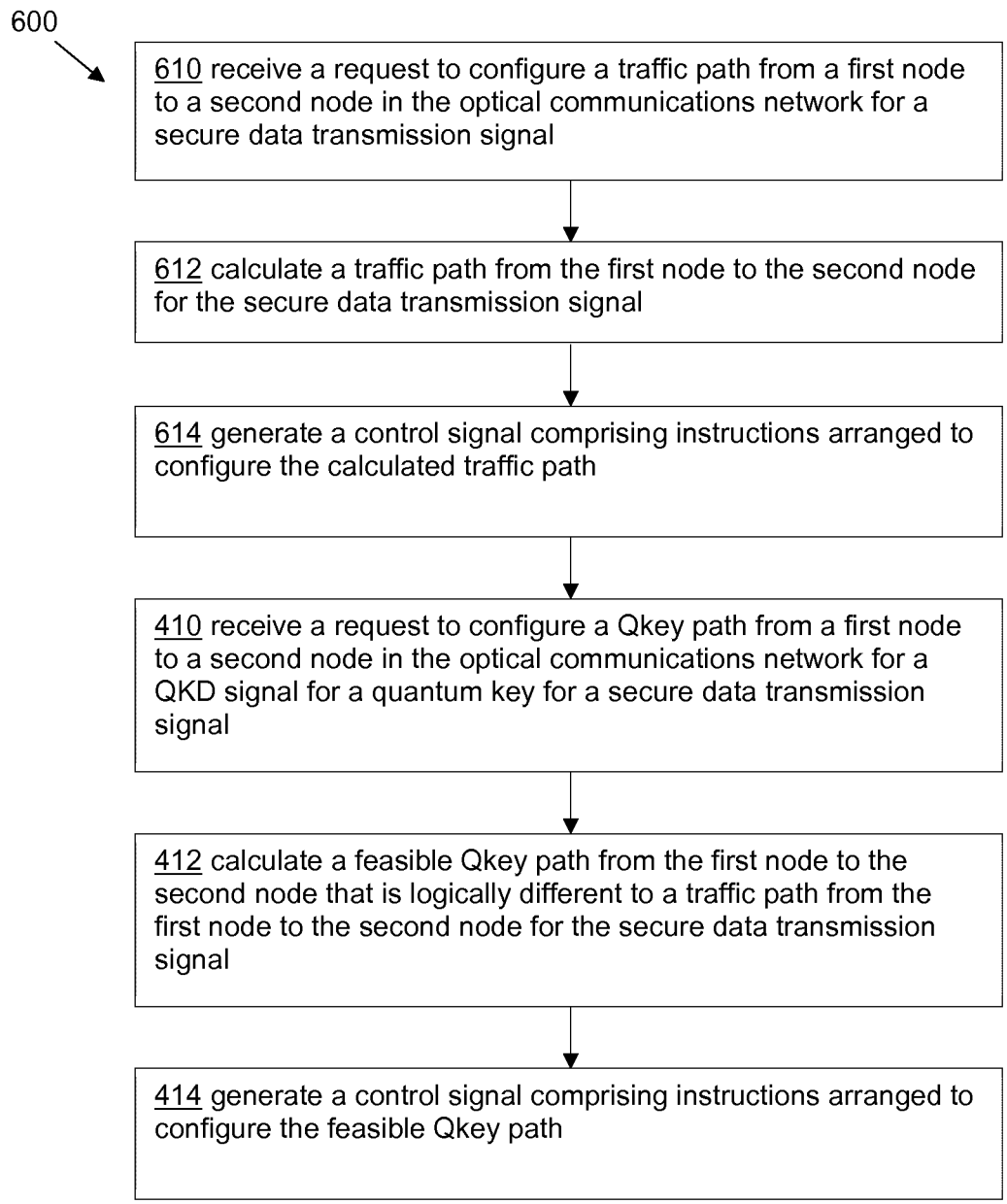
FIG. 9 illustrates steps of a method of secure data transmission in an optical communications network according to an embodiment of the invention.

Referring to FIG. 9, an embodiment of the invention provides a method 600 of secure data transmission in an optical communications network.

The method comprises steps of:

receiving 610 a request to configure a traffic path from a first node to a second node in the optical communications network for a secure data transmission signal;

calculating 612 a traffic path from the first node to the second node for the secure data transmission signal;

generating 614 a control signal comprising instructions arranged to configure the calculated traffic path.

The method further comprises steps of configuring an optical path for quantum key distribution in the optical communications network according to the method 400, 500 described above with reference to any of FIGS. 5 to 8.

In an embodiment, the traffic path from the first node to the second node is calculated based on a first path calculation algorithm and a first cost function. The Qkey path from the first node to the second node is calculated based on a second path calculation algorithm, different to the first path calculation algorithm and a second cost function, different to the first cost function.

In an embodiment, the method 600 comprises periodically calculating a new Qkey path for a new quantum key. A time period of the periodic calculation is lower than a predefined time. The predefined time depends on the encryption algorithm used to generate the quantum key and should be shorter than a time needed to hack the QKD signal. The predefined time can be updated, typically it would be expected to be shortened, with development of computation devices and techniques used for code breaking.

An embodiment of the invention provides a computer program, comprising instructions which, when executed on at least one processor, cause the at least one processor to carry out any of the above steps of the method 600 of secure data transmission in an optical communications network.

An embodiment of the invention provides a carrier containing a computer program, comprising instructions which, when executed on at least one processor, cause the at least one processor to carry out any of the above steps of the method 600 of secure data transmission in an optical communications network. The carrier is one of an electronic signal, optical signal, radio signal, or computer readable storage medium.

The invention claimed is:

1. A path computation engine for an optical communications network, the optical communications network comprising a plurality of nodes and a plurality of links, wherein the path computation engine comprises a processor and memory, the memory comprising instructions executable by the processor whereby the path computation engine is configured to:
receive a request to configure a quantum key (Qkey) path from a first node to a second node in the optical communications network for a quantum key distribution (QKD) signal for a quantum key for a secure data transmission signal;
calculate a feasible Qkey path from the first node to the second node that is logically different to a traffic path from the first node to the second node for the secure data transmission signal, wherein the Qkey path is feasible if an optical signal power originating from the secure data transmission signal within the Qkey path, caused by optical interference of the secure data transmission signal with the QKD signal, is below a predetermined threshold value; and
generate a control signal comprising instructions arranged to configure said feasible Qkey path.

2. The path computation engine of claim 1, wherein the memory comprises instructions executable by the processor whereby the path computation engine is further configured to calculate at least one of: a raw key bit rate for transmission of a quantum key on the QKD signal depending on transmission characteristics of the calculated feasible Qkey path; and a quantum bit error rate for transmission of a quantum key on the QKD signal depending on transmission characteristics of the calculated feasible Qkey path.

3. The path computation engine of claim 1, wherein the memory comprises instructions executable by the processor whereby the path computation engine is further configured to:
receive a request to configure a new Qkey path from the first node to the second node for a new quantum key for the secure data transmission signal; and
calculate a new feasible Qkey path from the first node to the second node that is logically different to the traffic path from the first node to the second node and is different to a previous Qkey path from the first node to the second node for a previous quantum key.

4. The path computation engine of claim 1, wherein the memory comprises instructions executable by the processor whereby the path computation engine is configured to calculate a feasible Qkey path by:
calculating a plurality of feasible Qkey paths from the first node to the second node, each calculated Qkey path being logically different to the traffic path; and
randomly selecting one of said plurality of feasible Qkey paths.

5. The path computation engine of claim 1, wherein the memory comprises instructions executable by the processor whereby the path computation engine is operative to assign a respective randomly calculated weight value to each link of the optical communications network and to calculate a feasible Qkey path depending on said weight values.

6. The path computation engine of claim 1, wherein the memory comprises instructions executable by the processor whereby the path computation engine is configured to calculate a feasible Qkey path from the first node to the second node that is physically different to the traffic path from the first node to the second node.

7. The path computation engine of claim 1, wherein the memory comprises instructions executable by the processor whereby the path computation engine is configured to calculate a feasible Qkey path from the first node to the second node that does not include a repeater.

8. A secure data transmission apparatus for an optical communications network, the secure data transmission apparatus comprising:
a traffic path computation engine comprising a processor and memory comprising instructions executable by the processor whereby the traffic path computation engine is configured to:
receive a request to configure a traffic path from a first node to a second node in the optical communications network for a secure data transmission signal;
calculate a traffic path from the first node to the second node for the secure data transmission signal; and
generate a control signal comprising instructions arranged to configure the calculated traffic path; and
a path computation engine comprising a processor and memory, the memory comprising instructions executable by the processor whereby the path computation engine is configured to:
receive, from the traffic path computation engine, a request to configure a quantum key (Qkey) path from a first node to a second node in the optical communications network for a quantum key distribution (QKD) signal for a quantum key for a secure data transmission signal;
calculate a feasible Qkey path from the first node to the second node that is logically different to a traffic path from the first node to the second node for the secure data transmission signal, wherein the Qkey path is feasible if an optical signal power originating from the secure data transmission signal within the Qkey path, caused by optical interference of the secure data transmission signal with the QKD signal, is below a predetermined threshold value; and
generate a control signal comprising instructions arranged to configure said feasible Qkey path.

9. The secure data transmission apparatus of claim 8, wherein the apparatus is configured to periodically calculate a new Qkey path for a new quantum key.

10. An optical communications network node comprising a path computation engine comprising a processor and memory, the memory comprising instructions executable by the processor whereby the path computation engine is configured to:
receive a request to configure a quantum key (Qkey) path from a first node to a second node in the optical communications network for a quantum key distribution (QKD) signal for a quantum key for a secure data transmission signal;
calculate a feasible Qkey path from the first node to the second node that is logically different to a traffic path from the first node to the second node for the secure data transmission signal, wherein the Qkey path is feasible if an optical signal power originating from the secure data transmission signal within the Qkey path, caused by optical interference of the secure data transmission signal with the QKD signal, is below a predetermined threshold value; and generate a control signal comprising instructions arranged to configure said feasible Qkey path.

11. A method of configuring an optical path for quantum key distribution in an optical communications network, the method comprising steps of:

receiving a request to configure a quantum key (Qkey) path from a first node to a second node in the optical communications network for a quantum key distribution (QKD) signal for a quantum key for a secure data transmission signal;

calculating a feasible Qkey path from the first node to the second node that is logically different to a traffic path from the first node to the second node for the secure data transmission signal, wherein the Qkey path is feasible if an optical signal power originating from the secure data transmission signal within the Qkey path, caused by optical interference of the secure data transmission signal with the QKD signal, is below a predetermined threshold value; and generating a control signal comprising instructions arranged to configure said feasible Qkey path.

12. The method of claim 11, further comprising calculating at least one of: a raw key bit rate for transmission of a quantum key on the QKD signal depending on transmission characteristics of the calculated feasible Qkey path; and a quantum bit error rate for transmission of a quantum key on the QKD signal depending on transmission characteristics of the calculated feasible Qkey path.

13. The method of claim 11, further comprising:

receiving a request to configure a new Qkey path from the first node to the second node for a new quantum key for the secure data transmission signal; and calculating a new feasible Qkey path from the first node to the second node that is logically different to the traffic path from the first node to the second node and is different to a previous Qkey path from the first node to the second node for a previous quantum key.

14. The method of claim 13, wherein calculating a feasible Qkey path comprises:

calculating a plurality of feasible Qkey paths from the first node to the second node, each calculated Qkey path being logically different to the traffic path; and randomly selecting one of said plurality of feasible Qkey paths.

15. The method of claim 13, wherein calculating a feasible Qkey path comprises:

assigning a respective randomly calculated weight value to each link of the optical communications network; and calculating a feasible Qkey path depending on said weight values.

16. The method of claim 11, wherein the method comprises calculating a feasible Qkey path from the first node to the second node that is physically different to the traffic path from the first node to the second node.

17. The method of claim 10, wherein the method comprises calculating a feasible Qkey path from the first node to the second node that does not include a repeater.

18. The method of claim 11, wherein the method comprises periodically calculating a new Qkey path for a new quantum key.

* * * * *